United States Patent
Zhang et al.

(10) Patent No.: US 10,039,043 B2
(45) Date of Patent: Jul. 31, 2018

(54) METHOD OF SELECTION AND/OR HANDOVER FOR MULTI RADIO ACCESS TECHNOLOGIES IN 5G CELLULAR NETWORK

(71) Applicant: Chongqing University of Posts and Telecommunications, Chongqing (CN)

(72) Inventors: Zhizhong Zhang, Chongqing (CN); Linlin Feng, Chongqing (CN); Haonan Hu, Chongqing (CN); Fang Cheng, Chongqing (CN)

(73) Assignee: CHONGQING UNIVERSITY OF POSTS AND TELECOMMUNICATIONS, Chongqing (CN)

(*) Notice: Subject to any disclaimer, the term of this patent is extended or adjusted under 35 U.S.C. 154(b) by 0 days.

(21) Appl. No.: 15/398,686

(22) Filed: Jan. 4, 2017

(65) Prior Publication Data

US 2017/0118689 A1 Apr. 27, 2017

Related U.S. Application Data

(63) Continuation-in-part of application No. PCT/CN2014/086165, filed on Sep. 9, 2014.

(30) Foreign Application Priority Data

Jul. 4, 2014 (CN) .......................... 2014 1 0317316

(51) Int. Cl.
*H04W 36/30* (2009.01)
*H04W 48/16* (2009.01)
(Continued)

(52) U.S. Cl.
CPC .......... *H04W 36/30* (2013.01); *H04B 17/318* (2015.01); *H04B 17/373* (2015.01);
(Continued)

(58) Field of Classification Search
CPC .... H04B 17/318; H04B 17/373; H04B 1/406; H04L 1/0018; H04L 63/0853;
(Continued)

(56) References Cited

U.S. PATENT DOCUMENTS 6,816,729 B1 * 11/2004 Halonen ............... H04W 36/30
455/436
2003/0188029 A1 * 10/2003 Shafran ................. H04W 16/18
709/249
(Continued)

*Primary Examiner* — George Eng
*Assistant Examiner* — Umair Ahsan
(74) *Attorney, Agent, or Firm* — Matthias Scholl P.C.; Matthias Scholl

(57) ABSTRACT

A method of selection and/or handover for multi radio access technologies in a 5G cellular network. The method includes: 1) collecting, by a user terminal, load information of a candidate Access Point (AP) or an Evolved Node (H)eNB via a local entity of Access Network Discovery and Selection Function (L-ANDSF); 2) checking, by the user terminal, a Received Signal Strength (RSS) value of the candidate AP or (H)eNB, a Reference Signal Received Quality (RSRQ) and a Service Sensitivity to Latency; 3) based on the above information, evaluating suitability of an available radio access technology; 4) triggering, by a specific triggering event, a fuzzy logic controller, to select a most appropriate radio access technology for each session; and 5) establishing a new session to perform admission control or handover.

4 Claims, 6 Drawing Sheets

(51) Int. Cl.
*H04B 17/318* (2015.01)
*H04B 17/373* (2015.01)
*H04W 48/20* (2009.01)
*H04L 1/00* (2006.01)
*H04W 76/04* (2009.01)
*H04W 84/12* (2009.01)
*H04L 29/06* (2006.01)
*H04W 76/27* (2018.01)

(52) U.S. Cl.
CPC ........... *H04L 1/0018* (2013.01); *H04W 48/16* (2013.01); *H04W 48/20* (2013.01); *H04L 63/0853* (2013.01); *H04W 76/046* (2013.01); *H04W 76/27* (2018.02); *H04W 84/12* (2013.01)

(58) Field of Classification Search
CPC ..... H04W 36/30; H04W 48/16; H04W 48/20; H04W 76/046; H04W 84/042; H04W 84/12; H04W 36/14; H04W 36/0083
See application file for complete search history.

(56) References Cited

U.S. PATENT DOCUMENTS

| | | | |
|---|---|---|---|
| 2005/0090277 A1* | 4/2005 | Islam | H04W 48/20 455/525 |
| 2010/0075677 A1* | 3/2010 | Wang | H04W 36/0055 455/436 |
| 2015/0017985 A1* | 1/2015 | Safavi | H04W 36/0083 455/436 |
| 2016/0278139 A1* | 9/2016 | Lei | H04W 28/08 |
| 2017/0150390 A1* | 5/2017 | Ahmad | H04W 28/0215 |
| 2017/0332291 A1* | 11/2017 | Sirotkin | H04W 36/0088 |

\* cited by examiner

METHOD OF SELECTION AND/OR HANDOVER FOR MULTI RADIO ACCESS TECHNOLOGIES IN 5G CELLULAR NETWORK

CROSS-REFERENCE TO RELATED APPLICATIONS

This application is a continuation-in-part of International Patent Application No. PCT/CN2014/086165 with an international filing date of Sep. 9, 2014, designating the United States, now pending, and further claims foreign priority benefits to Chinese Patent Application No. 201410317316.3 filed Jul. 4, 2014. The contents of all of the aforementioned applications, including any intervening amendments thereto, are incorporated herein by reference.

BACKGROUND OF THE INVENTION

Field of the Invention

The present invention relates to selection among multi radio access technologies (RATs) in cellular networks.

Description of the Related Art

When a user equipment (UE) powers up/reenters a cell-coverage area or is about to leave connected state, the existing LTE cellular network will perform cell-selection/reselection and handover procedures during selection and/or handover among multi RATs. Cell-selection/reselection procedure and cell-handover procedure are respectively shown in FIG. 1 and FIG. 2, which are complex, inefficient and time-consuming.

In the aforementioned cell-selection/reselection and handover procedures, usually a UE performs selection or handover between two types of networks, however, in scenarios with coverage of multi networks, it often results in frequent handover and, in the case of load increase, it also greatly affects average downlink throughput and average latency, and even affects normal communication.

Based on the existing network architecture, a fifth-generation (5G) mobile communication cellular network technology is being developed.

As shown in FIG. 3, a 5G mobile communication cellular network consists of three domains: Core Network, Radio access technology and User Equipment. A 5G cellular network integrates macrocells, picocells, femtocells and relay stations in a heterogeneous manner, and the entire network has flexible deployment, low cost, wide coverage and high network capacity. However, to build a 5G network, one of the issues to be considered is how to solve the above shortcomings of the conventional networks in a multi-RAT selection and/or handover.

SUMMARY OF THE INVENTION

The present invention relates to a radio access system, and more particularly, to a selection method for multi-RAT access among different access networks.

The present invention is directed to the problems in the prior art which lie in that a radio resource control (RRC) connection procedure between a UE and a Phantomcell is managed by the macrocell, that a Phantomcell is not assigned with separate signals and channels, and that a UE relies on macrocell signals to discover a Phantomcell, therefore, the present invention provides strategies for allowing multi-criteria access and/or handover among different access networks, as well as a RAT algorithm for selecting most appropriate RAT, which are intended for solving a variety of problems, such as multi-RAT coexistence, complexity of network selection, etc., in a 5G cellular network with ultra-dense deployment.

The present invention utilizes fuzzy logic controllers to combine various inputs (e.g., user's mobility, load of candidate BS, etc.) together, to achieve multi-RAT selection and/or handover in a 5G cellular network system. Specifically, when a UE performs selection access and/or handover among an evolved base station (eNB), a home evolved base station (HeNB) and a WiFi AP (WiFi access points), the method comprises: 1) collecting, by a user terminal, load information of a candidate Access Point (AP) or an Evolved Node (H)eNB via a local entity of Access Network Discovery and Selection Function (L-ANDSF); 2) checking, by the user terminal, a Received Signal Strength (RSS) value of the candidate AP or (H)eNB, a Reference Signal Received Quality (RSRQ) and a Service Sensitivity to Latency; 3) based on the above information, evaluating suitability of an available radio access technology; 4) triggering, by a specific triggering event, a fuzzy logic controller, to select a most appropriate radio access technology for each session; and 5) establishing a new session to perform admission control or handover.

Further, the above method is also applicable to RAT selection between a 5G cellular network and a WiFi network. A multi-RAT selection algorithm is provided, which comprises: setting user profiles, and letting specific triggering events upon occurrence trigger their corresponding trigger branches respectively, in which the trigger branches include: cellular+WiFi-network-dual-selection trigger branches I, II, III and automatic-authentication-for-connection-of-WiFi-network trigger branch I.

More specifically, when the triggering event received is "ANDSF new messages", the cellular+WiFi-network-dual-selection trigger branch I is triggered, then:
   a) the UE monitoring load indication and RSS and also updating its mobility information;
   b) calculating a candidate RAT list for each session; and
   c) determining whether the first candidate RAT in the candidate RAT list is the current RAT, if "Yes", maintaining the current RAT; if "No", performing handover to the first candidate RAT in the candidate RAT list, and determining whether the handover is successful, if the handover is successful, ending the access control or handover procedure of this time; if the handover is not successful, selecting the second candidate RAT in the list.

When the triggering event is occurrence of "establish new session", the cellular+WiFi-network-dual-selection trigger branch III is triggered, then the UE monitoring load indication and RSS and also updating its mobility information; calculating a candidate RAT list for each session; determining whether the first candidate RAT is the current RAT, if "Yes", maintaining the current RAT; if "No", determining whether a handover is successful, if the handover is successful, ending the access control or handover procedure of this time, if the handover is not successful, selecting the second candidate RAT.

When the triggering event is occurrence of "Hotspot2.0 new message received", the automatic-authentication-for-connection-of-WiFi-network trigger branch I is triggered, which allows mobile devices to automatically complete authentication for connection of WiFi network with a SIM (Subscriber Identification Module) card or other certifications, based on the Hotspot2.0 standards of IEEE802.11u.

The updating of the mobility information specifically comprises: when the triggering event "RSS Change monitored" upon occurrence triggers the cellular+WiFi-network-dual-selection trigger branch II, checking the service profile and determining whether it is a time critical service. If "Yes", performing a typical handover (if the degradation of the channel quality happens quickly and there is no sufficient time to evaluate a different candidate AP, then performing handover merely based on the estimated RSS value); if "No", establishing a new session, which in turn triggers the cellular+WiFi-network-dual-selection trigger branch III.

The method of the present disclosure employs the idea of decoupling control plane and user plane, so as to transfer the user plane to Phantomcells in high frequency bands for transmission, thereby providing a wider frequency band and higher capacity, and to retain the control plane information in the macrocell for transmission, thereby ensuring the reliability for transmission of control information. By providing multi-criteria access and/or handover strategies among different access networks, and with a RAT algorithm for selecting most appropriate RAT, the present invention reduces the overall number of handovers, meanwhile, in the case of load increase, it can decrease, to some extent, average throughput in both uplink and downlink and absolute reduction in average latency, and even at extremely high load, the average throughput of the proposed mechanism is increased. The reason lies in that as load increases, RAT suitability of a target cell continually decreases, so it is apt to perform handover to maintain the UE. It can be seen that throughput and latency are directly related to handover decisions. Thus, the multi-RAT selection and/or handover method provided by the present invention can effectively solves the problems of multi-RAT coexistence and complexity of network selection in a 5G cellular network with ultra-dense deployment.

DETAILED DESCRIPTION OF THE EMBODIMENTS

To make the objects, technical solutions and advantages of the present invention more clear, hereinafter the present invention will be described in more detail with reference to the embodiments. It should be understood that the specific embodiments described herein are merely for the purpose of explaining the invention and are not intended to be limiting of the invention.

Figure 1:
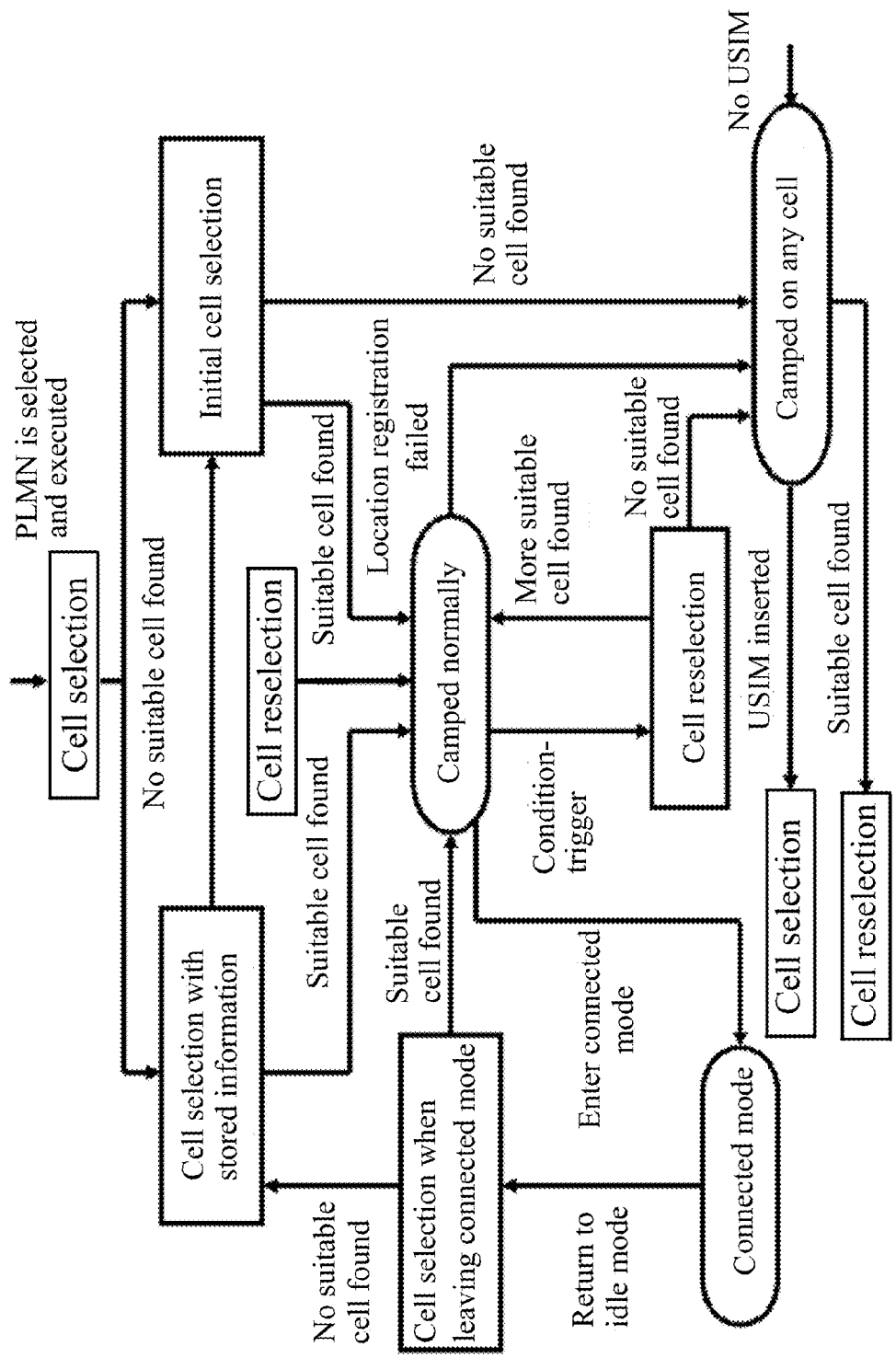
FIG. 1 is a schematic diagram of a cell-selection/reselection procedure in the prior art.
Figure 2:
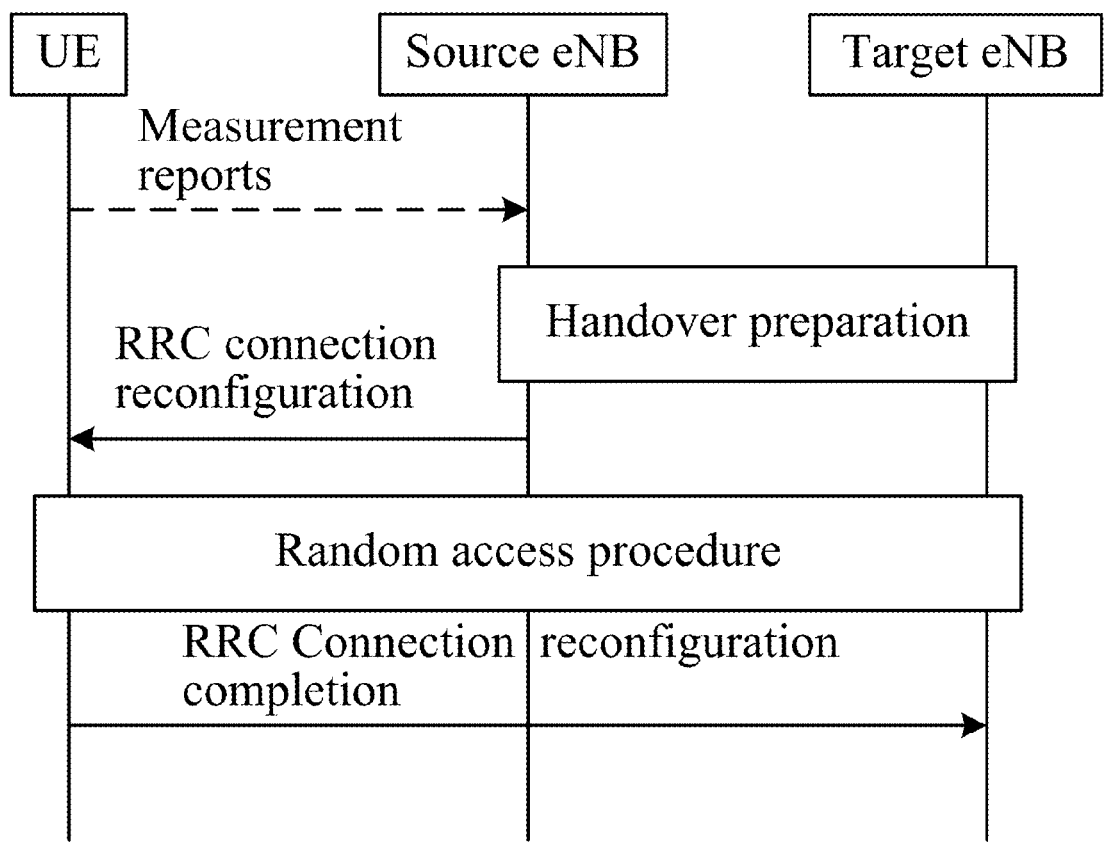
FIG. 2 is a schematic diagram of a cell-handover procedure in the prior art.
Figure 3:
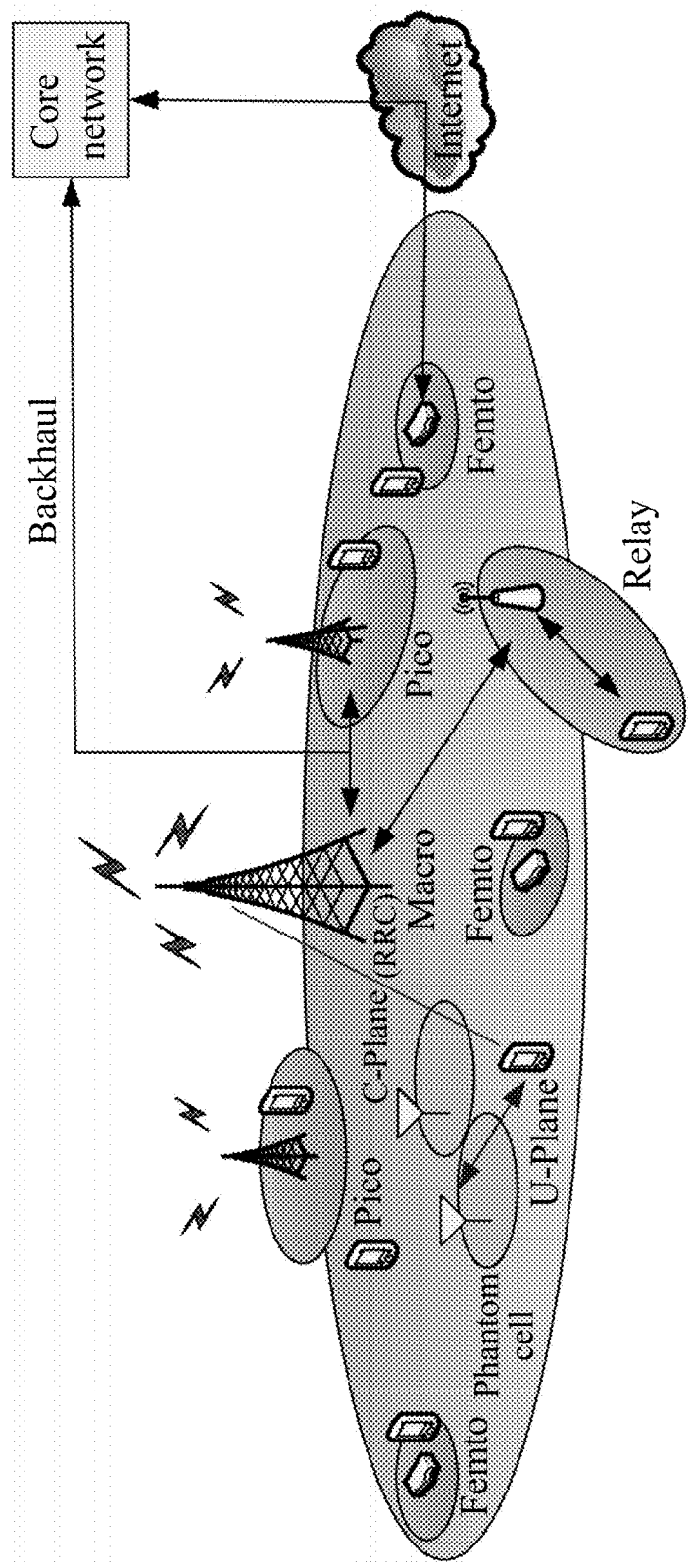
FIG. 3 is a schematic diagram of a 5G cellular network system architecture.

FIG. 3 shows a 5G cellular network system architecture. For convenience of explanation, only the parts related to the present invention are shown.

Based on the assumption that the core network is UMTS (Universal Mobile Telecommunications System) or EPC (Evolved Packet System), 3GPPP (Third Generation Partnership Project) has proposed different RAT integration schemes. The present invention is mainly focused on the latter (i.e., EPC). ANDSF enables the operator to store RAT-discovery-and-selection mechanisms (including WiFi-Hotspot-discovery information) in a server, and communicate with UEs via push or pull manners.

WiFiAlliance has proposed Hotspot2.0 standard based on IEEE802.11u (i.e., WiFi Certified Passpoint), and this standard allows mobile devices to automatically complete authentication for connection of network with a SIM card or other certifications. Hotspot 2.0 provides means to communicate with the UEs about information such as the load of access networks, the roaming information, etc., without the need for the terminal to associate itself to an AP.

This combination of ANDSF and HotSpot 2.0 provides an excellent basis for this embodiment, the complementarity of ANDSF and Hotspot 2.0 can support a number of multi-operator scenarios, moreover, cellular operators and wireless Internet service providers can cooperate and allow UEs to roam among them.

When a UE remains in a stationary state or moves at a constant speed in the 5G cellular network shown in FIG. 3, there will be various scenarios which require multi-RAT access/selection. By building on UE with multi-RAT access/selection method based on fuzzy logic strategies, the present invention provides a comprehensive evaluation of RAT suitability based on status information of multiple input parameters (for example, the input parameters used in this embodiment are: mobility state of the UE, load of H(e)NB or AP, backhaul load of H(e)NB or AP, RSRQ, and Service Sensitivity to Latency), so as to guide the UE to select/handover to a most appropriate network.

The method of the present invention utilizes fuzzy logic controllers to combine various inputs (e.g., user's mobility, load of candidate BS, etc.) together, to achieve multi-RAT selection and/or handover in a 5G cellular network system. A user terminal UE collecting load information of a candidate Access Point (AP) or an Evolved Node (H)eNB via a local entity of Access Network Discovery and Selection Function (L-ANDSF); the UE checking the Received Signal Strength (RSS) value of the candidate AP or (H)eNB, the Reference Signal Received Quality (RSRQ) and the Service Sensitivity to Latency; based on the above information, evaluating suitability of an available radio access technology; a specific triggering event triggering a fuzzy logic controller to select the most appropriate radio access technology for each session; establishing a new session to perform admission control or handover.

Figure 4:
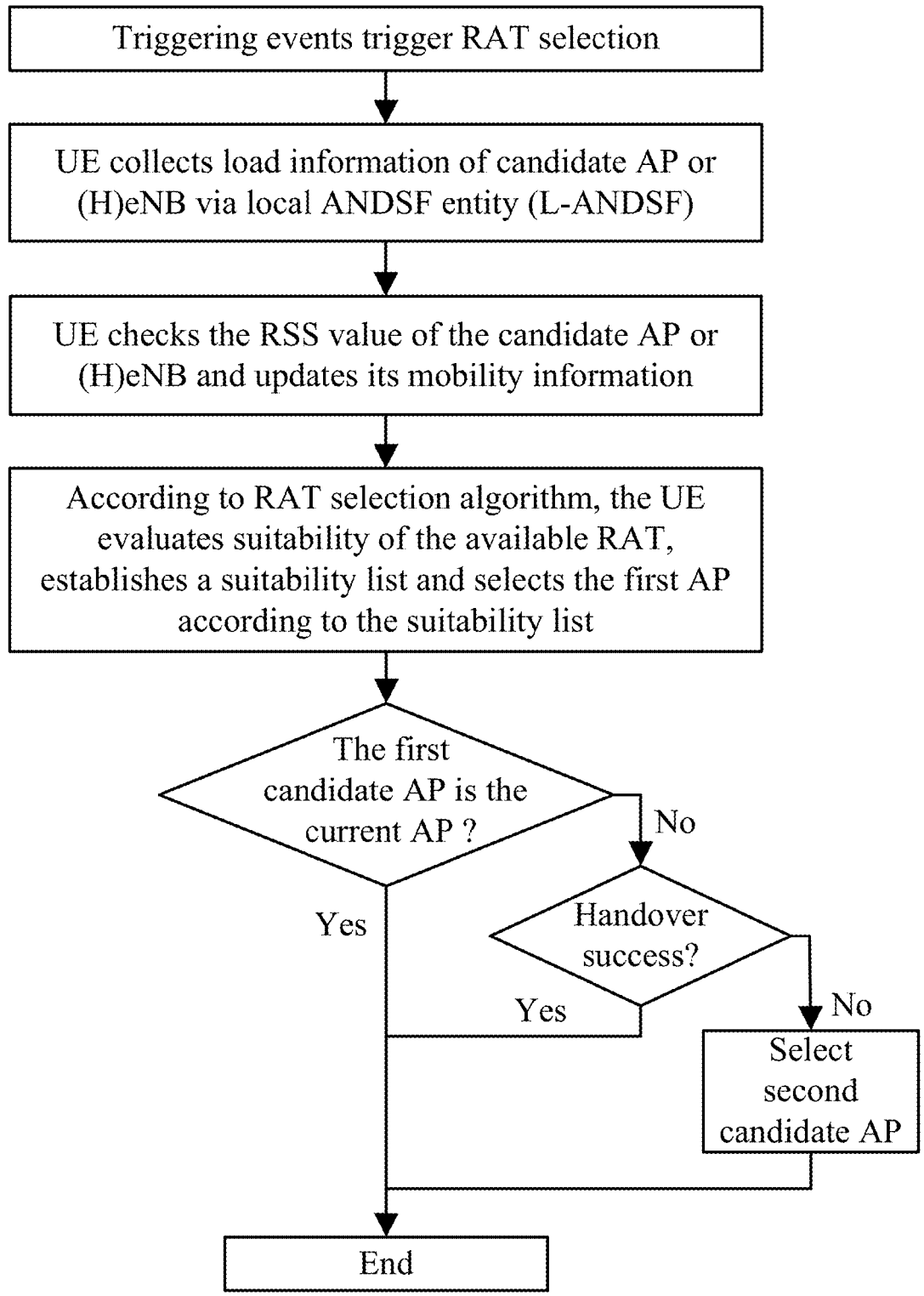
FIG. 4 is a workflow of a fuzzy logic controller system according to one embodiment of the present invention.
Figure 5:
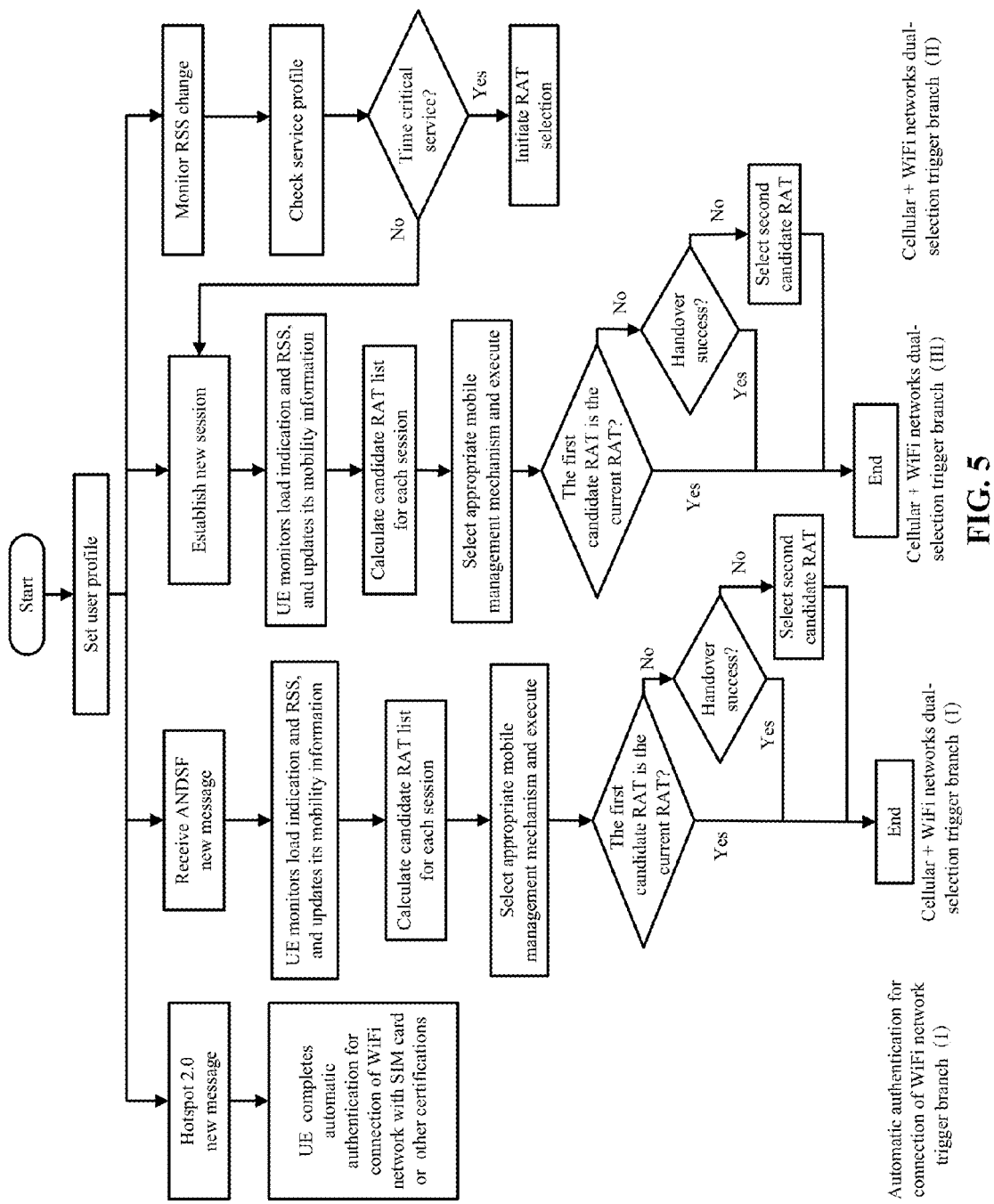
FIG. 5 is a schematic diagram showing a structure of trigger branches of a RAT-selection algorithm according to one embodiment of the present invention.

Specifically, when a UE performs selection access and/or handover among a macrocell (eNB), a femtocell (HeNB) and a WiFi AP, the method comprises 5 steps, and FIG. 4 shows a workflow of a fuzzy logic controller system:
a) a triggering event triggering RAT-selection;
b) a UE collecting load information of a candidate AP or (H)eNB via a local ANDSF entity (L-ANDSF);
c) the UE checking the RSS value of the candidate AP (Access Point) or (H)eNB (evolved base station or home evolved base station) and updates its mobility information;
d) according to a RAT-selection algorithm (that is, as shown in FIG. 5, a specific event occurs and triggers a corresponding specific trigger branch), the UE evaluating suitability of an available RAT, establishing a suitability list, and selecting the first AP according to the suitability list, and in turn establishing a new session or performing a handover; and e) if the handover fails, selecting the second AP in the suitability list.

Further, the above method is also applicable to RAT selection between a 5G cellular network and a WiFi network.

FIG. 5 shows a structure of the trigger branches of the RAT-selection algorithm. The method comprises: setting a user profile, that is, a user defining his preferences either on a per-service basis or on a comprehensive consideration of the services (e.g., http traffic is only handovered in the case of a free WiFi network or uses always the RAT that minimizes the energy consumption); letting specific triggering events upon occurrence trigger their corresponding trigger branches respectively, in which the trigger branches include: cellular+WiFi-network-dual-selection trigger branches I, II, III and automatic-authentication-for-connection-of-WiFi-network trigger branch I.

More specifically, when the triggering event received is "ANDSF new messages", the cellular+WiFi-network-dual-selection trigger branch I is triggered, then:

a) the UE monitoring load indication and RSS and also updating its mobility information;

b) calculating a candidate RAT list for each session; and c) determining whether the first candidate RAT is the current RAT, if "Yes", maintaining the current RAT; if "No", performing handover to the first candidate RAT in the candidate RAT list, and determining whether the handover is successful, if the handover is successful, ending the access control of this time; if the handover is not successful, selecting the second candidate RAT in the candidate RAT list.

When the triggering event is occurrence of "establish new session", the cellular+WiFi-network-dual-selection trigger branch III is triggered, then the UE monitoring load indication and RSS and also updating its mobility information; calculating a candidate RAT list for each session; determining whether the first candidate RAT is the current RAT, if "Yes", maintaining the current RAT; if "No", determining whether a handover is successful, if the handover is successful, ending the access control or handover procedure of this time, if the handover is not successful, selecting the second candidate RAT.

The updating of the mobility information specifically comprises: when the triggering event "RSS Change monitored" upon occurrence triggers the cellular+WiFi-network-dual-selection trigger branch II, checking the service profile and determining whether it is a time critical service. If "Yes", performing a handover to the first candidate RAT in the candidate RAT list, and determining whether the handover is successful; if "No", establishing a new session, which in turn triggers the cellular+WiFi-network-dual-selection trigger branch III.

When the triggering event is occurrence of "Hotspot2.0 new message received", the automatic-authentication-for-connection-of-WiFi-network trigger branch I is triggered, which allows mobile devices to automatically complete authentication for connection of WiFi network with a SIM card or other certifications, based on the Hotspot2.0 standards of IEEE802.11u.

Figure 6:
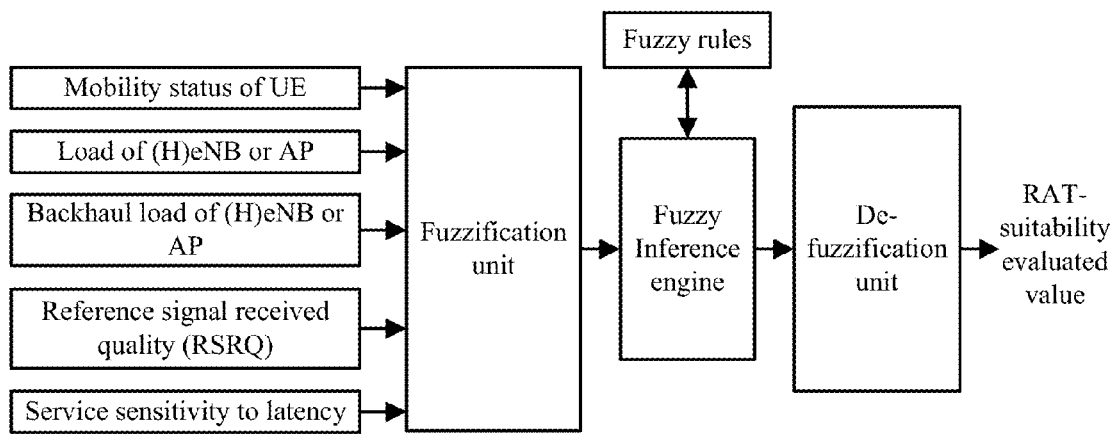
FIG. 6 is a schematic diagram showing a structure of a fuzzy logic controller system according to one embodiment of the present invention.

FIG. 6 shows a structure of a FLC (fuzzy logic controller) system according to the present invention.

Each FLC comprises a fuzzification unit, a fuzzy inference engine and a defuzzification unit. The fuzzification unit undertakes transformation of input measured values of parameters into aggregation of fuzzy logics in which, for example, a signal can be described as "weak", "medium" and "strong". The Fuzzy inference engine is the core part of the FLC, and correlates inputs and outputs via a group of "If . . . Then . . . " rules (conditional rules), with each output corresponding to a rule result. The defuzzification unit converts the fuzzy outputs of the aggregation (that is, all results of the rules at the inference stage) into scalar-value outputs.

Specifically, with respect to the 4 trigger branches in FIG. 5, apart from automatic-authentication-for-connection-of-WiFi-network trigger branch I, all the cellular+WiFi-network-dual-selection trigger branches I, II, III need to utilize the FLC to make corresponding RAT-selection and/or handover decisions.

For any one of the cellular+WiFi-network-dual-selection trigger branches I, II, III, after being triggered by a respective triggering event, during their RAT-selection and/or handover procedures, the workflow of the FLC is as follows:

a) the fuzzification unit transforms the input values into levels (e.g., the RSRQ [cell's RSRQ] value is transformed into "low", "medium" or "high"), and transforms the input measured values of parameters into aggregation of fuzzy logics;

b) the aggregation of fuzzy logics is input to the fuzzy inference engine, that is, by processing with a group of "If . . . Then . . . " rules, aggregation of fuzzy decisions is obtained; and c) the aggregation of fuzzy decisions output from the fuzzy inference engine is integrated into a fuzzy set which is input to the defuzzification unit to be transformed into scalar-value (i.e. RAT suitability) outputs.

This embodiment employs three FLCs, that is, the number of the FLCs is the same as the number of the access networks, and each FLC corresponds to one type of RAT, namely, LTE macrocell, femtocell or WiFi. Every time that the FLC is triggered (i.e., initiation of a handover or of a new session admission control), all the available (H)eNBs and APs are evaluated.

The inputs for every fuzzy inference engine are the RSRQ, the Service Sensitivity to Latency, the load of (H)eNB or AP, and the backhaul load of the (H)eNB or AP, as well as the UE's mobility status. Each of the inputs is fuzzified to "low", "medium", and "high" membership functions. On the one hand, because each state is well defined and zero value exist for each state, so, apart from the service sensitivity to latency, all the inputs are fuzzified to "low", "medium", and "high" membership functions (using triangular and trapezoidal membership functions). On the other hand, for the service sensitivity to latency, in order to highlight the fact that all its states have non-zero values, Gaussian input membership functions are used. It should be noted that, here, the RSRQ, the Service Sensitivity to Latency, the load of (H)eNB or AP, the backhaul load of the (H)eNB or AP and the UE's mobility status are fuzzified by triangular membership functions or trapezoidal membership functions or Gaussian membership functions in a form as below: a) defining an output fuzzy set, wherein the number of the fuzzy sets varies with the number of the input parameters. For example, the RSRQ is divided into three fuzzy sets: GL (high), ML (middle), PL (low), with the value range of (−19.5, −3) dBm; b) choosing membership functions for fuzzification of the inputs, wherein the membership functions vary with input parameters. For example, a triangular membership function (Formula 1) is chosen for fuzzification of the RSRQ. The formula 1, the expressions 1, 2, 3 and m, n can be adjusted to achieve an optimization target. It should be further noted that trapezoidal membership functions and Gaussian membership functions can also be adjusted on the expressions and the corresponding definitions of the intervals of the functions, based on different circumstances.

$$\mu_{RSRQ} = \begin{cases} \mu_{GL}(x) = \text{expression 1} & -19.5 \leq x \leq m \\ \mu_{ML}(x) = \text{expression 2} & m \leq x \leq n \\ \mu_{PL}(x) = \text{expression 3} & n \leq x \leq -3 \end{cases} \quad (1)$$

$$m, n \in (-19.5, -3)$$

As aforementioned, according to the fuzzy logic strategies, a number of parameters are input to the fuzzy inference engine; then, the aggregation of fuzzy decisions output from the fuzzy inference engine is input to the defuzzification unit and transformed into scalar-value (i.e. RAT suitability) outputs, and the outputs of the defuzzification procedure are the results of the decision-making procedure. The input parameters used in this embodiment are: mobility state of the UE, load of H(e)NB or AP, backhaul load of H(e)NB or AP, RSRQ, and Service Sensitivity to Latency.

In this embodiment, for every three fuzzy inference engines (that is, each fuzzy inference engine respectively corresponds to eNB, HeNB or WiFi AP), the rules covering all possible input combinations may be defined by the equipment manufacturer in the system settings. On the one hand, if the UE is not overloaded or its backhaul link is not overloaded and the UE is moving at a low speed, then the UE tends to be considered as an attachment point of (H)eNB/AP that is sensed with high RSRQ (i.e. good channel quality). On the other hand, if the UE is overloaded in both the access link and the backhaul link, and thus it will not be able to deliver high QoS to the user, so it will not launch high-data-rate services, regardless if an attachment point with high RSRQ is sensed by the UE.

In addition, the defuzzification procedure integrates all the outcomes of all the rules to a certain output value, i.e., RAT suitability. The defuzzification procedure is similar to the fuzzification procedure, using membership functions for capturing the levels of a specific state that the output belongs to.

In this embodiment, Gaussian membership functions are employed, in order to exploit smooth and non-zero features (the decision-making needs to be based on all inputs' range). At every decision occasion, all the potential access points are evaluated and sorted. The attachment point with the highest RAT suitability is selected for starting the admission control or handover procedure; in case of a rejection, the second in the list is selected for initiating that admission control or handover procedure.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method of selection and/or handover for multi radio access technologies in a 5G cellular network, the method comprising:
1) collecting, by a user terminal, load information of a candidate Access Point (AP) or an Evolved Node (H)eNB via a local entity of Access Network Discovery and Selection Function (L-ANDSF);
2) checking, by the user terminal, a Received Signal Strength (RSS) value of the candidate AP or (H)eNB, a Reference Signal Received Quality (RSRQ) and a Service Sensitivity to Latency;
3) based on the load information, the RSS value, the RSRQ, and the Service Sensitivity to Latency, evaluating suitability of an available radio access technology (RAT);
4) triggering a fuzzy logic controller by a specific triggering event, setting a user profile, and allowing the specific triggering event to correspond to a RAT trigger branch so as to select a candidate RAT for a first network session; and
5) establishing a second network session to perform admission control or handover:

wherein:
the RAT trigger branch is selected from cellular+WiFi-network-dual-selection trigger branches and an automatic-authentication-for-connection-of-WiFi-network trigger branch;
the cellular+WiFi-network-dual-selection trigger branches comprise a cellular+WiFi-network-dual-selection trigger branch I, a cellular+WiFi-network-dual-selection trigger branch II, and a cellular+WiFi-network-dual-selection trigger branch III;
the cellular+WiFi-network-dual-selection trigger branches correspond to triggering events "ANDSF new message received," "RSS change monitored," and "Establish new session;"
the automatic-authentication-for-connection-of-WiFi-network trigger branch corresponds to a triggering event "Hotspot 2.0 new message received;" and
when the triggering event is "ANDSF new message received," the cellular+WiFi-network-dual-selection trigger branch I is triggered and a trigger procedure thereof comprises: monitoring, by the user terminal, load indication and RSS and also updating mobility information thereof; calculating a candidate RAT list for the first network session; determining whether a first candidate RAT in the candidate RAT list is a current RAT of the first network session, if "Yes," maintaining the current RAT, if "No," determining whether a handover is successful, if the handover is successful, ending the access control of this time, if the handover is not successful, selecting a second candidate RAT in the candidate RAT list.

2. The method of claim 1, wherein the updating the mobility information comprises: when the triggering event "RSS Change monitored" triggers the cellular+WiFi-network-dual-selection trigger branch II, checking the service profile; determining whether it is a time critical service, if "Yes," performing a typical handover, if "No," establishing a third network session, and triggering the cellular+WiFi-network-dual-selection trigger branch III.

3. A method of selection and/or handover for multi radio access technologies in a 5G cellular network, the method comprising:
1) collecting, by a user terminal, load information of a candidate Access Point (AP) or an Evolved Node (H)eNB via a local entity of Access Network Discovery and Selection Function (L-ANDSF);
2) checking, by the user terminal, a Received Signal Strength (RSS) value of the candidate AP or (H)eNB, a Reference Signal Received Quality (RSRQ) and a Service Sensitivity to Latency;
3) based on the load information, the RSS value, the RSRQ, and the Service Sensitivity to Latency, evaluating suitability of an available radio access technology (RAT);
4) triggering a fuzzy logic controller by a specific triggering event, setting a user profile, and allowing the specific triggering event to correspond to a RAT trigger branch so as to select a candidate RAT for a first network session; and
5) establishing a second network session to perform admission control or handover:

wherein:
the RAT trigger branch is selected from cellular+WiFi-network-dual-selection trigger branches and an automatic-authentication-for-connection-of-WiFi-network trigger branch;
the cellular+WiFi-network-dual-selection trigger branches comprise a cellular+WiFi-network-dual-selection trigger branch I, a cellular+WiFi-network-dual-selection trigger branch II, and a cellular+WiFi-network-dual-selection trigger branch III;
the cellular+WiFi-network-dual-selection trigger branches correspond to triggering events "ANDSF new message received," "RSS change monitored," and "Establish new session;"
the automatic-authentication-for-connection-of-WiFi-network trigger branch corresponds to a triggering event "Hotspot 2.0 new message received;" and
when the triggering event is "establish new session," the cellular+WiFi-network-dual-selection trigger branch III is triggered and a trigger procedure thereof comprises: the user terminal monitoring load indication and RSS and also updating mobility information thereof; calculating a candidate RAT list for the first network session; determining whether a first candidate RAT in the candidate RAT list is a current RAT of the first network session, if "Yes," maintaining the current RAT, if "No," determining whether a handover is successful, if the handover is successful, ending the access control of this time, if the handover is not successful, selecting a second candidate RAT in the candidate list.

4. The method of claim 3, wherein the updating the mobility information comprises: when the triggering event "RSS Change monitored" triggers the cellular+WiFi-network-dual-selection trigger branch II, checking the service profile; determining whether it is a time critical service, if "Yes," performing a typical handover, if "No," establishing a third network session, and triggering the cellular+WiFi-network-dual-selection trigger branch III.

* * * * *